(12) United States Patent
Baba et al.

(10) Patent No.: US 11,486,979 B2
(45) Date of Patent: Nov. 1, 2022

(54) LIGHT RECEIVING ARRAY AND LIDAR DEVICE

(71) Applicant: NATIONAL UNIVERSITY CORPORATION YOKOHAMA NATIONAL UNIVERSITY, Yokohama (JP)

(72) Inventors: Toshihiko Baba, Kanagawa (JP); Keisuke Kondo, Kanagawa (JP); Hiroshi Abe, Kanagawa (JP)

(73) Assignee: NATIONAL UNIVERSITY CORPORATION YOKOHAMA NATIONAL UNIVERSITY, Yokohama (JP)

(*) Notice: Subject to any disclaimer, the term of this patent is extended or adjusted under 35 U.S.C. 154(b) by 539 days.

(21) Appl. No.: 16/618,073

(22) PCT Filed: May 22, 2018

(86) PCT No.: PCT/JP2018/019605
§ 371 (c)(1),
(2) Date: Nov. 27, 2019

(87) PCT Pub. No.: WO2018/221310
PCT Pub. Date: Dec. 6, 2018

(65) Prior Publication Data
US 2020/0158833 A1    May 21, 2020

(30) Foreign Application Priority Data

May 30, 2017 (JP) .............................. JP2017-106710

(51) Int. Cl.
*G01S 7/4863* (2020.01)
*G01S 17/06* (2006.01)
*G01S 17/89* (2020.01)

(52) U.S. Cl.
CPC ............ *G01S 7/4863* (2013.01); *G01S 17/06* (2013.01); *G01S 17/89* (2013.01)

(58) Field of Classification Search
CPC ......... G01S 7/4863; G01S 17/89; G01S 17/06
See application file for complete search history.

(56) References Cited

U.S. PATENT DOCUMENTS 9,733,499 B1*  8/2017  Ben Bakir  ........... G02B 6/1228
2003/0215190 A1* 11/2003  Lampert  .............. G02B 6/3812
                                                                385/76

(Continued)

FOREIGN PATENT DOCUMENTS

WO    2013088938 A1    6/2013
WO    2017126386 A1    7/2017

*Primary Examiner* — Shawn S An
(74) *Attorney, Agent, or Firm* — McCoy Russell LLP

(57) ABSTRACT

A light receiver array according to the present invention is constituted by array-aligning plural receivers having slow light waveguides of photonic crystals, and a LiDAR device according to the present invention is constituted by linearly arranging a light receiver array and a transmitter. An arranging relationship of plural receivers of the light receiver array is an array-like element formed by array-aligning plural receivers having the slow light waveguides of photonic crystals, and the array alignment is defined by alignment for defining a position relationship between the plural receivers constituting the light receiver array, and orientation for defining a direction of each receiver. A relationship p=λ/sin Δθr is satisfied between the alignment pitch p, wavelength λ of the reception light, and an arrival angle Δθr when a phase difference between reception lights received by waveguide ends of adjacent receivers is one wavelength. Such a constitution that the arrival angle Δθr is equal to a widening angle Δθt of radiation light is suitable.

10 Claims, 15 Drawing Sheets

(56) References Cited

U.S. PATENT DOCUMENTS

2014/0184437 A1 7/2014 Takabayashi et al.
2018/0031765 A1* 2/2018 Hassan ................ H01L 31/105
2019/0033522 A1* 1/2019 Baba ..................... G02F 1/2955
2019/0204419 A1* 7/2019 Baba ...................... G02B 6/124

* cited by examiner

LIGHT RECEIVING ARRAY AND LIDAR DEVICE

CROSS-REFERENCE TO RELATED APPLICATIONS

The present application is a U.S. National Phase of International Patent Application Serial No. PCT/JP2018/019605 entitled "OPTICAL RECEIVER ARRAY AND LIDAR DEVICE," filed on May 22, 2018. International Patent Application Serial No. PCT/JP2018/019605 claims priority to Japanese Patent Application No. 2017-106710 filed on May 30, 2017. The entire contents of each of the above-referenced applications are hereby incorporated by reference for all purposes.

TECHNICAL FIELD

The present invention relates to a light receiving array, and a LiDAR device with the light receiving array.

BACKGROUND ART

The technical field of a laser radar or a LiDAR (light detection and ranging, laser imaging detection and ranging) device using laser measurement for fetching a distance to a peripheral object as two-dimensional image is used for automatic-driving of a vehicle, three-dimensional map production and the like, and its base technique can be applied to a laser printer, a laser display and the like.

In this technical field, an optical beam is collided with an object, and reflected light reflected and returned by the object is detected. Information on a distance is fetched from its time difference and a frequency difference, and the optical beam is scanned two-dimensionally, so as to fetch the three-dimensional information.

A light deflection device is used for optical beam scanning. Conventionally, mechanical mechanisms such as rotation of an entire apparatus, mechanical mirrors like a polygon mirror and a Galvano mirror, and a small integrated mirror by a micro-machine technique (MEMS technique) are used. However, there are problems of large size, high price, and non-stability of a vibrating mobile body, so recently, non-mechanical light deflection devices have been developed.

A phased array type and a diffraction grating type for realizing light deflection by changing wavelength of light and refractive index of a device are proposed as a non-mechanical light deflection device. However, the phased array type light deflection device has such a problem that phase adjustment of multiple light radiators aligned in array is very difficult and sharp light beam with high quality cannot be formed. Meanwhile, the diffraction grating type light deflection device has such a problem that sharp beam is easily formed but a light deflection angle is small.

To the problem of the small light deflection angle, the present inventors suggest a technique for increasing the light deflection angle by coupling a slow light waveguide to a diffraction mechanism such as a diffraction grating (Patent Literature 1). The slow light is generated in a photonic nanostructure like a photonic crystal waveguide, has a low group speed, and significantly changes a propagation constant by slight change of wavelength and refractive index of the waveguide. When the diffraction mechanism is provided inside or immediately near the slow light waveguide, the slow light waveguide is coupled to the diffraction mechanism into a leakage waveguide, so as to emit light in a free space. At that time, the significant change of the propagation constant reflects the deflection angle of radiation light, as a result, a large deflection angle is realized.

FIGS. 10A to 10D show a device structure having a diffraction mechanism in a photonic crystal waveguide for propagating light with low group speed (slow light), and a brief concept of radiation light. A light deflection device 101 includes a photonic crystal waveguide 102 having a double cycle structure formed by repeating circular holes with two kinds of different diameters along a waveguide in a plane of photonic crystal. The double cycle structure constitutes the diffraction mechanism, and converts slow light propagation light to a radiation condition and emits it in a space.

The light deflection device 101 forms a photonic crystal waveguide 102 by a grating array 103 in which circular holes (low refractive index portions) 106 are aligned in a high refractive index member 105 on a clad 108 made of a low refractive index material such as $SiO_2$. The grating array 103 of the low refractive index portion 106 has, for example, a double cycle structure of a cycle structure for repeating circular holes with large diameter, and a cycle structure for repeating circular holes with small diameter. In the grating array 103 of the photonic crystal waveguide 102, a portion at which the circular hole 106 is not provided, constitute a waveguide core 107 for propagating incident light.

High quality beam is formed on the radiation light in a vertical direction, and the radiation light is expanded and emitted in a horizontal direction. Here, a vertical direction is a direction along a waveguide core, and a waveguide traveling direction of the propagation light propagating through the photonic crystal waveguide 102. A horizontal direction is a direction orthogonal to a direction along the waveguide core 107, and a direction orthogonal to the waveguide traveling direction of the propagation light.

FIGS. 10B, 10C are diagrams for explaining distribution of beam strength of the radiation light, FIG. 10B shows the beam strength distribution in the vertical direction, and FIG. 10C shows the beam strength angle distribution in the horizontal direction.

In FIG. 10B, the propagation light is gradually leaked while advancing along the waveguide core, and becomes sharp radiation light in which the beam strength distribution in the vertical direction is aligned. In FIG. 10C, the beam strength angle distribution in the horizontal direction of the radiation light has wide angle distribution.

In the horizontal direction angle distribution of the radiation light, when there is the distribution shape of the complex beam strength having plural peaks of the widening in the horizontal direction and the beam strength, each waveguide distribution in the horizontal direction becomes a factor for deteriorating conversion efficiency to parallel beam from the radiation light.

FIG. 10D shows one constitution for restraining widening of the radiation light in the horizontal direction. In this constitution, a collimate lens such as a cylindrical lens 104 is provided above the light deflection device 101, and the radiation light from the waveguide core is converted to parallel beam, so as to restraining widening of the radiation light in the horizontal direction.

The radiation light is polarized in the vertical direction by changing wavelength of the incident light, and changing the refractive index of the photonic crystal waveguide 102 with heating. Thereby, the light deflection device forms light beam collimated in both of vertical and horizontal directions.

The LiDAR device uses two light deflection devices for transmission and reception. The light deflection device for transmission is used as a transmitter and the light deflection device for reception is used as a receiver. The radiation light is emitted from the transmitter and is collided with an object (subject) to be measured, and the reflected light reflected and returned by the object is detected by the receiver. The LiDAR device generates frequency chirp light signals, divides them into reference light and signal light, emits the signal slight from the light deflection device for transmission, and receives the reflected light colliding with the object and moving forward and backward by the light deflection device for reception. The detection light is mixed with the reference light, and a distance to the subject is obtained from the obtained beat signals.

A technique for detecting a distance to a target and relative speed by transmitting and receiving radar waves, for example in a radar device, is known (Patent Literature 2).

CITATION LIST

Patent Literature

Patent Literature 1: Japanese Patent Application No. 2016-10844
Patent Literature 2: International Patent Publication No. WO2013/088938

SUMMARY OF INVENTION

Technical Problem

When a laser radar or LiDAR (Light Detection and Ranging, Laser Imaging Detection and Ranging: hereinafter referred to as "LiDAR device") is constituted using a light deflection device (light polarizer: hereinafter referred to as "a light deflection device") using a slow light waveguide of photonic crystal as shown in FIG. 10, the light deflection device not only is used as a transmitter 121 for emitting light beam, but also can be used as a receiver 111 for receiving reflected light formed by colliding, reflecting, scattering and returning the beam of radiation light by an object (not shown). According to this constitution, when the arrival angle of the reflected light received by the receiver 111 is coincident with a radiation angle of the radiation light emitted from the transmitter 121, the reflected light can be efficiently received.

Generally, the transmitter is required to emit the beam with a small widening angle $\Delta\theta t$ and sharp directivity to a space. When length of opening of the transmitter (size at a portion for emitting the light) is sufficiently large compared to wavelength $\lambda$ of the emission light, diffraction is restrained and sharp beam can be formed. For example, in the constitution that the opening length of the transmitter is 3 mm to the emission light of wavelength $\lambda=1.55$ µm, the widening angle $\Delta\theta t$ of the light beam is calculated as about 0.03°. When the angle range of 30° is swept using the light beam having such widening angle $\Delta\theta t$, a resolution point of 30°/0.03°=1,000 points can be obtained. This resolution point has a performance sufficient as the light deflection device of the LiDAR device.

The receiver is required to have sharp directivity similar to the transmitter, and also is required to receive reception signals as large as possible.

FIG. 1 shows a constitution example of a laser radar or LiDAR (Light Detection and Ranging, Laser Imaging Detection and Ranging: hereinafter referred to as "LiDAR device") using a light deflection device (light polarizer: hereinafter referred to as "a light deflection device").

The constitution shown in FIG. 1 is a constitution of a transmitter/receiver expected when the light deflection device of the slow light waveguide is used. A transmitter 121 is used as a light deflection device for transmission, and a receiver 111 is used as a light deflection device for reception. The transmitter 121 and the receiver 111 are linearly aligned, and a collimate lens such as a cylindrical lens 104 is arranged at an upper position of these light deflection devices. In this constitution, the light deflection device not only is used as the transmitter 121 for emitting the light beam, but also is used as the receiver 111 for receiving the reflected light formed by colliding, reflecting, scattering and returning the beam of radiation light by an object (not shown).

In the above-mentioned constitution, a setting value of length Lt of a slow light waveguide 122 for transmission of the transmitter 121 is, for example, 3 mm, and sharp beam is formed in a waveguide traveling direction (hereinafter referred to as a vertical direction). In a direction orthogonal to the waveguide traveling direction (hereinafter referred to as a horizontal direction), the light emitted from the slow light waveguide 122 for transmission is widened, and is collimated by a collimate lens (cylindrical lens 104). In this constitution, approximately circular spot-like light beam is emitted in a space. When the reflected light is returned to a slow light waveguide 112 for reception of the receiver 111, it goes through an optical path in a procedure opposite to the transmission. In the constitution of the transmitter/receiver shown in FIG. 1, when the arrival angle of the reflected light received by the receiver 111 is coincident with a radiation angle of the radiation light emitted from the transmitter 121, the reflected light can be efficiently received.

The reflected light returned from the object away from the LiDAR device is generally returned widely, all of the arrival angles of the reflected light received by the receiver are not coincident with the radiation angle of the radiation light, so that the receiver receives one part of the reflected light.

It is considered that strength of reception signals is proportional to a reception area, so that it is expected that the strength of the reception signals is increased in proportion to the reception area by widening the reception area of the receiver. Using this relationship between the reception area and the reception signal strength, such a constitution is expected that the slow light waveguide for reception is made longer than the slow light waveguide for transmission to increase the reception area in order to increase the reception signals of the receiver.

However, actually, even when the slow light wavelength for reception is made long and the reception area is made large, the signal strength in proportion to the reception area cannot be obtained.

The slow light waveguide realizes a large light deflection effect by delaying propagation speed of light and increasing a mutual reaction to the waveguide. On the contrary, it has such a nature that propagation loss due to incompleteness in manufacturing the waveguide is increased. For example, in a test in which the slow light waveguide is compared with a Si thin line waveguide manufactured in a similar method, it is evaluated that the propagation loss of the slow light waveguide is 3-10 times larger than the propagation loss of the Si thin line waveguide.

In this manner, when the waveguide with large propagation loss is made simply long, as shown by an arrow in the slow light waveguide 112 for reception of FIG. 1, the received light is extinguished while it is propagated through the slow light waveguide. Finally, a reception output corresponding to the length of the slow light waveguide 112 for reception cannot be obtained. Also, thickness of the arrow in the slow light waveguide 112 for reception of FIG. 1 schematically shows the strength of the light propagating through the slow light waveguide.

FIG. 2 shows reception strength to length Lr of the slow light waveguide for reception. FIG. 2 shows examples that the propagation loss of the slow light waveguide is 0 dB/cm, 1 dB/cm, 5 dB/cm, and 10 dB/cm. In FIG. 2, when 10 dB/cm that is traditional propagation loss evaluated in a test is evaluated, the reception strength is increased according to the length in a range that the length Lr of the slow light waveguide for reception is shorter than a point P (Lr=1 cm), but the reception strength is rarely increased when the length is longer than the point P.

The object of the present invention is to increase the signal strength of the reception signals of the receiver by solving the above-mentioned problem.

Solution to Problem

A light receiver array according to the present invention is constituted by array-aligning plural receivers having photonic crystal slow waveguides. Also, a LiDAR device according to the present invention is constituted by linearly arranging the light receivers array and transmitters.

[Light Receiver Array]

The light receiver array according to the present invention is (a) an array-like element formed by array-aligning plural receivers having photonic crystal slow waveguides. In the array alignment, an arrangement relationship of plural receivers is defined by (b) alignment for defining a position relationship between plural receivers constituting the light receiver array, and (c) an orientation for defining a direction of each receiver.

(a) Array Alignment

In the array alignment, forms for defining the number of plural receivers include (a1) a form using a short receiver as a starting point, and (a2) a form using a long receiver as a starting point.

(a1) The number of the receivers is set based on signal strength obtained by multiplexing the respective reception signals obtained by the plural short receivers, and signal strength of the reception signals to be obtained by the light receiver array.

(a2) The long receiver is divided into plural receivers, and the division number is set based on the signal strength obtained by multiplexing the reception signals obtained by the plural divided receivers, and the signal strength of the reception signals to be obtained by the light receiver array.

In any of forms (a1) and (a2), the number of the plural receivers is set based on the signal strength obtained by multiplexing the reception signals of the plural receivers and the signal strength to be obtained by the light receiver array. When the entire length of the light deflection device is at the same degree, the array alignment constitution of the plural receivers increases the signal strength in comparison to a single constitution with a long receiver.

(b, c) Alignment and Orientation

In the alignment (b) and the orientation (c) of the plural receivers for specifying the arrangement relationship of the plural receivers, (b) the alignment of each receiver is linear alignment along a one straight line direction at an alignment pitch p in the array alignment of the plural receivers. The alignment (b) makes alignment intervals of the receivers correspond to the alignment pitch p, so as to receive the reflected light in the same phase.

(c) Regarding the orientation of each receiver, a traveling direction of the slow light waveguide for reception of each receiver is parallel to an aligning direction of linear alignment of the plural receivers in its orientation direction.

In the arrangement relationship of each receiver, the alignment (b) of the receiver is linear alignment and the orientation direction of the orientation (c) of each receiver is parallel to the aligning direction of linear alignment, so that the plural receivers of the light receiver array receives the reflected light with the same arrival angle, and receives the reflected light in the same phase by making the alignment interval of each receiver correspond to the alignment pitch p, so as to increase the signal strength of the reception signals of the receiver.

The receiver may be provided with (d) length limitation on the length in the traveling direction of the slow light waveguide for reception of the receiver, in addition to (a) the array alignment, (b) the alignment and (c) the orientation of the above-mentioned plural light receivers.

Regarding the length limitation (d) in the traveling direction of the slow light waveguide for reception of the receiver, (d) the length in the traveling direction of the slow light waveguide for reception of each receiver is in an unsaturated range in which the reception strength to the length of the slow light waveguide monotonously changes.

The reception strength of the slow light waveguide has an unsaturated region and a saturated region with different changing conditions to the waveguide length. The unsaturated region is a region monotonously changed according to the length while the propagation loss in the slow light waveguide depends on the waveguide length, and the saturated region is a region not changed even when the waveguide length is changed by increasing an attenuating amount of propagation light. The constitution of the length limitation (d) in the traveling direction of the slow light waveguide for reception of the receiver limits the length in the traveling direction of the slow light waveguide for reception within the unsaturated range in which the reception strength to the length of the slow light waveguide is monotonously changed. By this length limitation, the length of the slow light waveguide for reception is within effective length at which the reception signals can be effectively utilized, so as to restrain the light deflection device from having excessive length.

When the length of the light deflection device is limited by this length limitation, the substantial propagation loss generated in the slow light waveguide of the receiver is reduced, so as to restrain reduction of the reception strength of the receiver and increase the signal strength of the reception signals of the receiver.

Alignment Pitch:

In the alignment between the receivers, when the alignment pitch p is length at which a phase of the reception light at a waveguide end is displaced by one wavelength, a condition that phases of the reception lights are aligned on a reception face of the receiver is satisfied, so that an interface for increasing light outputs of the reception signals finally multiplexed by the light receiver array occurs. When an initial angle for causing the increasing interference is $\Delta\theta r$, the condition for increase is expressed by a following formula if the wavelength of the reception light is $\lambda$.

$$p \cdot \sin \Delta\theta r = \lambda \qquad (1)$$

In the light receiver array according to the present invention, the alignment pitch p of the plural receivers has a relationship expressed by $p=\lambda/\sin \Delta\theta r$ using the wavelength λ of the reception light and the arrival angle Δθr of the reception light when the phase difference between the reception light received at the waveguide ends of the adjacent receivers corresponds to one wavelength, the signal strength of the reception signals of the receiver is increased.

Furthermore, in consideration of a widening angle Δθt of radiation light, an angle difference Δθ between the light beam at a certain angle and the light beam at the next angle is set to the widening angle Δθt, so that an object can be entirely scanned with the small number of beams without causing overlapping or a gap of the radiation light.

Furthermore, when the angle difference Δθt is matched with an angle Δθr at which the reception strength becomes large to satisfy Δθt=Δθr, scanning efficiency and reception strength become sufficient. At that time, the alignment pitch is expressed by p=λ/sin Δθt, and is defined by the wavelength λ and the widening angle Δθt of radiation light.

(Output Form of Receiver)

The light receiver array according to the present invention has (i) a form for outputting reception signals per receiver, and (ii) a form for multiplexing reception signals of the respective receivers and outputting one reception signal, as forms for outputting the reception signals of the receiver.

(i) Output Form Per Receiver:

In the form for outputting the reception signals per receiver, a photodiode is optically coupled to a waveguide end of a slow light waveguide for reception via a low loss light waveguide, and the slow light waveguide for reception and the photodiode are paired, so as to output the reception signals per receiver. In this output form, the light waveguide lengths of the respective low loss light waveguides of each pair of the receiver and the photodiode are made identical to each other, so as to uniform the propagation loss in the low loss light waveguide and the signal strength of the reception signal per receiver.

(ii) Output Form of Multiplication Reception Signals:

The form for multiplexing the reception signals of the respective receivers and outputting one reception signal includes an emission waveguide connected to the waveguide end of the slow light waveguide for reception of each receiver, a first jointer for jointing the emission waveguide to the next connection waveguide, a second jointer for jointing the connection waveguide to the other connection waveguide, and a final waveguide for guiding the output signals formed by multiplexing the reception outputs of the respective receivers to an output end. The emission waveguide, the connection waveguide and the final waveguide are low loss light waveguide, and have the same length of each optical path from the slow light waveguide for reception to the final waveguide.

The reception signals of the respective receivers are jointed to the next waveguide by the first jointer connected via the emission waveguide. The jointed reception signals are further jointed to the next connection waveguide by the second jointer connected via the connection waveguide. The sequentially jointed and multiplexed reception signals are guided to the final waveguide at a final stage, and outputted as output signals from the output end.

The emission waveguide, the connection waveguide and the final waveguide are constituted by the low loss light waveguide such as a Si thin line waveguide by photonic crystal, so that propagation loss generated while the reception signals of the receiver are propagating is reduced, and the output strength of the output signals obtained by multiplication is improved.

Also, in the emission waveguide and the connection waveguide, by making the respective optical path lengths for propagating the reception signals of the respective receivers equal to each other, the reception signals with the aligned phases are incident on each jointer, in the same phase at the waveguide end of each receiver. Thereby, loss generated by phase displacement of the reception signals is reduced in the jointer.

Phase Adjustment:

In a constitution that the optical path lengths are identical to each other from the waveguide end to the jointer, the phase might be displaced by local swing of width and thickness of the waveguide. The phase displacement due to phase adjusters provided on the emission waveguide and the connection waveguide is restrained. The phase adjuster is not necessarily provided on all of the emission waveguides and the connection waveguides, but may be selectively provided, for example, in the emission waveguide and the connection waveguide connected to the jointer, among the plural emission waveguides and the connection waveguides for receiving the reception signals to the jointer.

Number of Receivers:

(i) Output Form Per Receiver:

In a form for outputting reception signals per receiver, the number of receivers is optionally set.

(ii) Output Form of Multiplication Reception Signals:

A form for multiplexing reception signals of the respective receivers and outputting one reception signal may include a constitution for using an optional number of receivers, and a constitution for using a power-of-two number of receivers. In the constitution for using the power-of-two number of receivers, a first jointer is provided at a position of optical path length equal from emission waveguides of adjacent receivers in an array alignment direction to multiplex the reception signals of two receivers to the connection waveguide, and a second jointer is provided at a position of optical path length equal from adjacent connection waveguides in an array alignment direction to multiplex the reception signals of two connection waveguides to the next connection waveguide. The constitutions of the connection waveguide and the second jointer are sequentially repeated, so as to multiplex the reception signals of all receivers to the final waveguide.

The number of the receivers is made power-of-two, so that the jointers for making the reception signals of the two receivers incident are used, and the optical path lengths from each receiver to the final waveguide can be made equal to each other. By making the optical path lengths equal to each other, loss due to phase displacement of the reception signals at each jointer can be reduced.

[LiDAR Device]

A LiDAR device according to the present invention includes a light receiver array according to the present invention, and one transmitter for emitting radiation light having a photonic crystal slow light waveguide.

Regarding the relationship between the transmitter and the light receiver array, in the alignment direction of the light receiver array, the traveling direction of the waveguide of the receiver is the same as the traveling direction of the waveguide of the transmitter, and the wavelength of the radiation light of the transmitter and the wavelength of the reception light of the receiver has the same wavelength λ, and the widening angle of the radiation light of the transmitter is Δθt.

Also, the angle between the adjacent radiation lights emitted from the transmitter and the widening angle of the radiation light have the same angle Δθt, and the angle Δθt is the same as the arrival angle Δθr when the phase difference between the reception lights received at the waveguide ends of the adjacent receivers corresponds to one wavelength.

The relationship between the angle $\Delta\theta t$ and the angle $\Delta\theta r$ is made to satisfy the above-mentioned relationship ($\Delta\theta t = \Delta\theta r$), so that the signal strength of the reception signals received by the receivers can be increased.

Advantageous Effects of Invention

As explained above, the light receiver array and the LiDAR device according to the present invention can increase the signal strength of the reception signals of the receivers.

DETAILED DESCRIPTION

Hereinafter, embodiments of the present invention will be explained in details with reference to the drawings. A brief constitution example of a light receiver array according to the present invention will be explained with reference to FIG. 3, and a relationship between the number of receivers constituting the light receiver array and signal strength of reception signals will be explained with reference to FIG. 4. A constitution example of the light receiver array according to the present invention will be explained with reference to FIGS. 5, 6A-6D, and alignment pitch of plural receivers will be explained with reference to FIGS. 7A-7D, 8A-8F. A constitution of a LiDAR device will be explained with reference to FIG. 9.

(Brief Explanation of Light Receiver Array)

Figure 3:
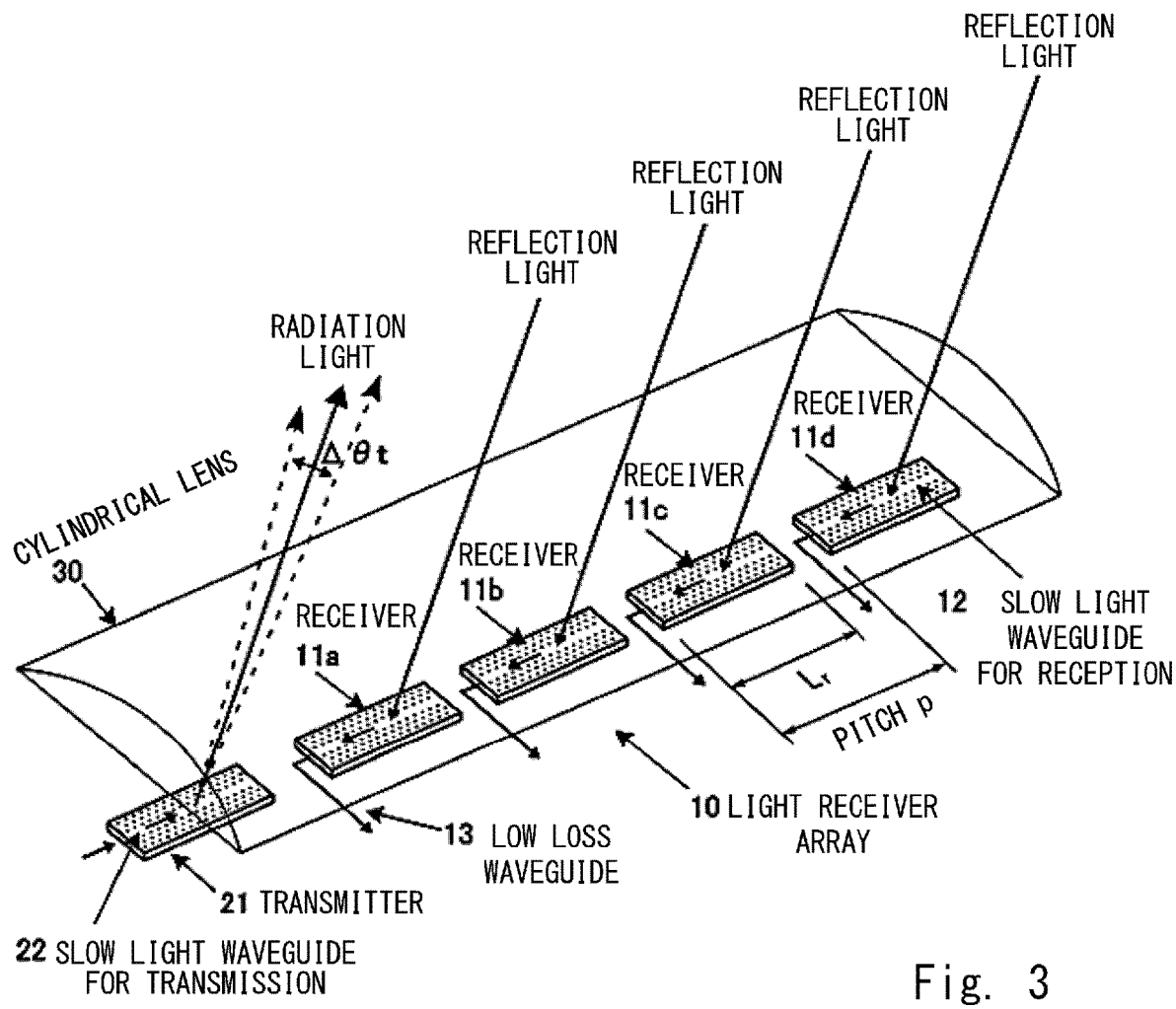
FIG. 3 is a diagram for explaining a light reception array according to the present invention.

FIG. 3 is a diagram for explaining a light receiver array according to the present invention. A light deflection device includes two light polarizers of a light receiver array 10 including a transmitter 21 and plural receivers 11a-11d. The transmitter 21 and the receivers 11a-11d are constituted by a photonic crystal waveguide. The photonic crystal waveguide is formed by a grating array in which low refractive index portions are periodically arranged in a high refractive index member of a semiconductor material such as Si provided on a clad. The low refractive index portions can be formed, for example, by circular holes provided to the high refractive index member.

A waveguide core for propagating light is formed on the photonic crystal waveguide. The waveguide core is formed by a portion at which circular holes are not arranged at one part of the grating array, in the grating array constituted by alignment of the circular holes. The waveguide core of the transmitter 21 constitutes a slow light waveguide 22 for transmission, and the waveguide cores of the receivers 11a-11d constitute a slow light waveguide 12 for reception.

Incident light incident on the slow light waveguide 22 for transmission of the transmitter 21 is emitted to outside from the slow light waveguide 22 for transmission while being propagated through the slow light waveguide 22 for transmission in a length direction. The slow light waveguide 12 for reception of the receivers 11a-11d receives reflected light, and propagates it in the length direction, and then, outputs reception signals through a low loss light waveguide 13 such as a Si thin line waveguide from a waveguide end.

The transmitter 21 and the light receiver array 10 are linearly and vertically aligned in the length direction of the slow light waveguide 22 for transmission and the slow light waveguide 12 for reception. In the vertical alignment, the transmitter 21 is arranged on a side on which the incident light is incident, and the light receiver array 10 is arranged on a side on which the emission light is received.

The light deflection device includes one cylindrical lens 30 as a collimate lens for converting light into parallel light, in addition to the transmitter 21 and the light receiver array 10. The cylindrical lens 30 is provided on the side of a face for emitting the radiation light and a face for receiving reflected light to the transmitter 21 and the light receiver array 10 vertically aligned, so as to be overlaid along a vertical alignment direction of the light deflection device.

The cylindrical lens 30 has such a size, for example, to have width equal to or larger than width of the transmitter 21 and the light receiver array 10, and length equal to or longer than length of two light deflection devices (10, 21) vertically aligned. Also, the size of the cylindrical lens 30 is not limited to the size almost the same as that of the vertical alignment, and may be optional size, as long as the size is sufficient that the radiation light emitted from the transmitter 21 is converted to parallel beam and emitted to an object (not shown) and the reflected light reflected by the object is collected to the respective receivers 11a-11d of the light receiver array 10.

The light receiver array 10 according to the present invention is constituted by an array-like element formed by array-aligning the plural receivers 11a-11d having photonic crystal slow light waveguides. Also, the light receiver array 10 shown in FIG. 3 has a constitution that four receivers 11a-11d are aligned in array, but the number of the array alignment is not limited to 4, and may be optional. When the number of array-alignment is made power-of-two, a constitution of a waveguide for multiplexing reception signals is made to have a symmetry property to restrain phase displacement of the reception signals when being propagated through the waveguide, so that loss of a jointer caused by the phase displacement can be reduced. The array-alignment of power-of-two will be explained later.

In the light receiver array 10 according to the present invention, by a constitution that a low loss light waveguide 13 such as Si thin line waveguide is connected to a waveguide end of the slow light waveguide 12 for reception of plural receivers 11 to pick up reception light, before the loss by the slow light waveguide of the slow light waveguide 12 for reception, the reception light can be picked up from the slow light waveguide 12 for reception.

Figure 4:
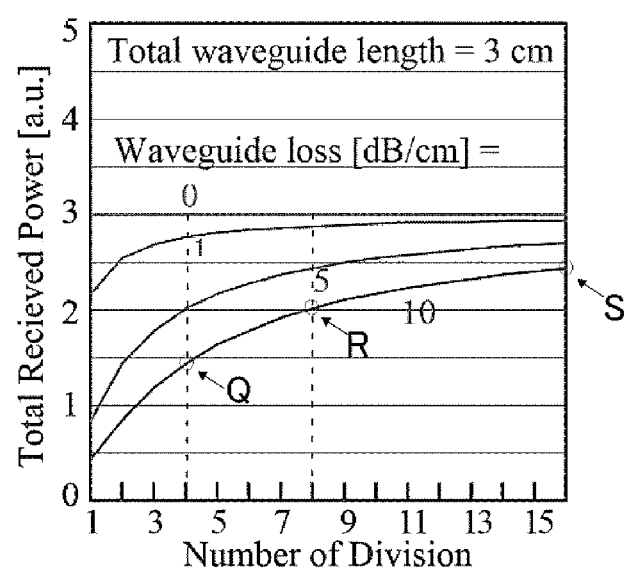
FIG. 4 is a diagram for explaining a relationship between the number of receivers constituting the light receiver array and signal strength of reception signals.

FIG. 4 shows reception strength that can be obtained when it is supposed that light picked up from each slow light waveguide for reception can be ideally multiplexed, to the division number of the waveguide. Also, FIG. 4 shows when total extension of the slow light waveguide for reception is 3 mm, and when the waveguide loss is 0 dB/cm, 5 dB/cm, and 10 dB/cm, respectively.

In the case that the waveguide loss is 10 dB/cm, compared to when the light receiver is one slow light waveguide for reception, about 3 times larger reception strength can be obtained when the slow light waveguide 12 for reception is divided into four and the light receiver array 10 is constituted by four receivers 11 (Q in FIG. 4), about 4 times larger reception strength can be obtained when the slow light waveguide 12 for reception is divided into eight and the light receiver array 10 is constituted by eight receivers 11 (R in FIG. 4), and about 5 times larger reception strength can be obtained when the slow light waveguide 12 for reception is divided into sixteen and the light receiver array 10 is constituted by sixteen receivers 11 (S in FIG. 4).

Then, the constitution of the light receiver array according to the present invention will be explained with reference to (a) array alignment, (b) alignment of receivers and (c) orientation of the receivers for defining an arrangement relationship of plural receivers in the array alignment.

(a) Array Alignment

In the array alignment, forms for defining the number of plural receivers include (a1) a form using a short receiver as a starting point, and (a2) a form using a long as a starting point.

(a1) The number of the receivers is set based on signal strength obtained by multiplexing the respective reception signals obtained by the plural short receivers, and signal strength of the reception signals to be obtained by the light receiver array.

(a2) The long receiver is divided into plural receivers, and the division number is set based on the signal strength obtained by multiplexing the reception signals obtained by the plural divided receivers, and the signal strength of the reception signals to be obtained by the light receiver array.

In the form (a1), the number of the receivers is set based on the signal strength of the reception signals obtained by each receiver and the signal strength of the reception signals to be obtained by the light receiver array. When, the signal strength of the reception signals of the receiver is small, the number of the receivers is increased by the number sufficient to satisfy the signal strength of the reception signals of the light receiver array, and when the signal strength of the reception signals of the receiver is large, the number of the receivers is decreased by the number sufficient to satisfy the signal strength of the reception signals of the light receiver array.

In the form (a2), a long receiver is divided into plural receivers, and the division number is set so that the signal strength obtained by multiplexing the reception signals of the plural divided receivers satisfies desired signal strength. When the signal strength obtained by multiplexing the reception signals of the receivers does not satisfy desired signal strength, the division number is increased to increase the number of receivers.

In any of forms (a1) and (a2), the number of the plural receivers is set based on the signal strength of the reception signals obtained by the receiver, and signal strength obtained by the light receiver array. By array-aligning the plural set receivers, larger signal strength than that can be obtained by a single receiver can be obtained.

The arrangement relationship between the plural receivers is defined by (b) alignment for defining such a position relationship between the plural receivers, what relationship the positions of the respective receivers have, and (c) orientation for defining a direction, in what direction each receiver is.

(b) Alignment of Receivers

In the alignment of the receivers, the alignment of each receiver is linear alignment along a one straight line direction at an alignment pitch p in the array alignment of the plural receivers. By making the alignment interval of each receiver correspond to the alignment pitch p, the reflected light with the same phase is received.

(c) Orientation of Receivers

Regarding the orientation of each receiver, a traveling direction of the slow light waveguide for reception of each receiver is parallel to an aligning direction of linear alignment of the plural receivers in its orientation direction.

In the arrangement relationship of each receiver, the alignment of the receiver is linear alignment and the orientation direction of each receiver is parallel to the orientation direction of linear alignment, so that the plural receivers of the light receiver array receive the reflected light with the same arrival angle. The received reflected light is made to have the same phase and the arrival angle is made equal, so as to increase the signal strength of the reception signals of the receiver.

(d) Length Limitation of Slow Light Waveguide for Reception of Receiver

The receiver according to the present invention may be provided with length limitation on the length in the traveling direction of the slow light waveguide for reception of the receiver, in addition to (a) the array alignment, (b) the alignment and (c) the orientation, as mentioned above.

Figure 1:
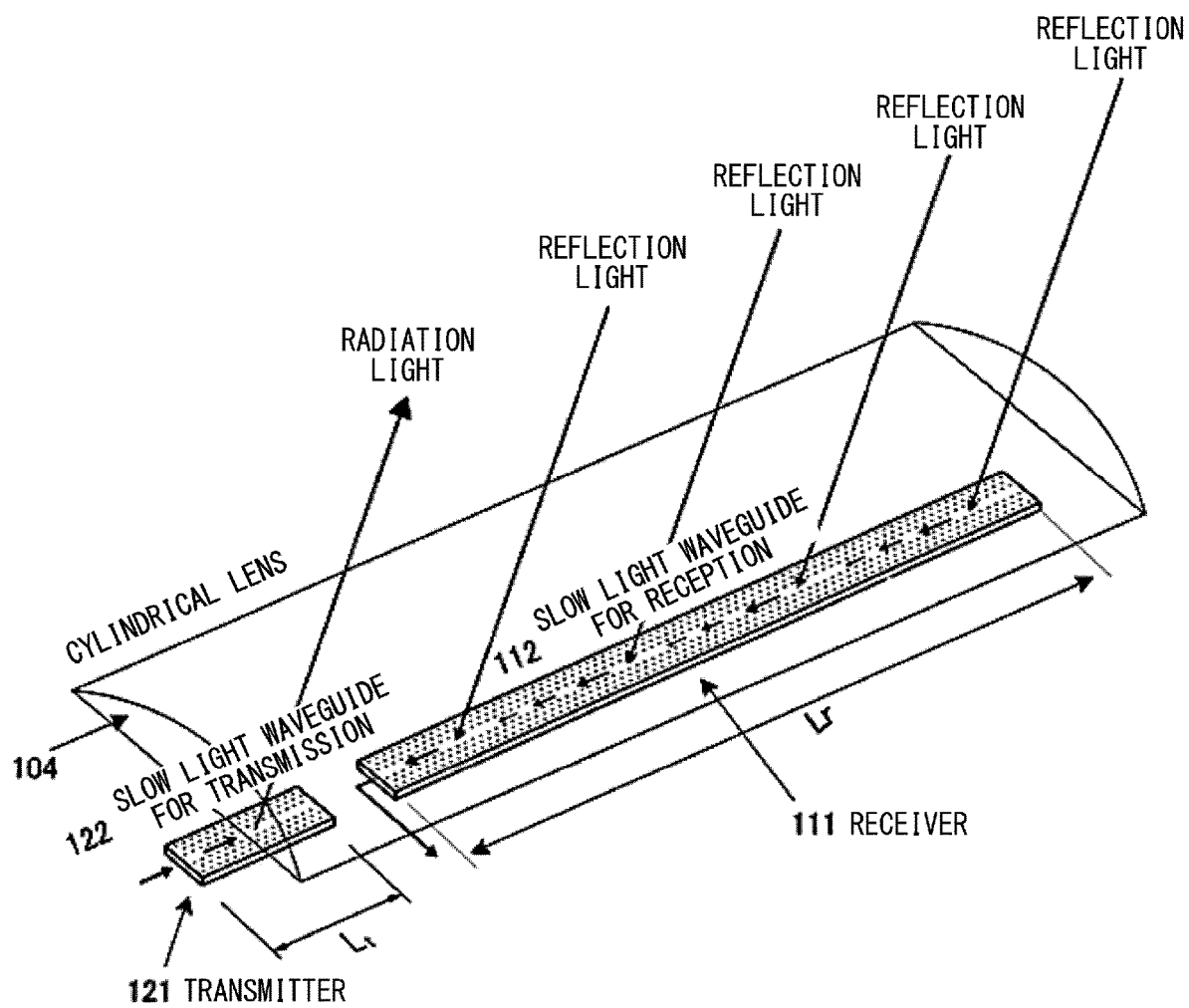
FIG. 1 is a diagram showing one constitution of a LiDAR device using a light deflection device.
Figure 2:
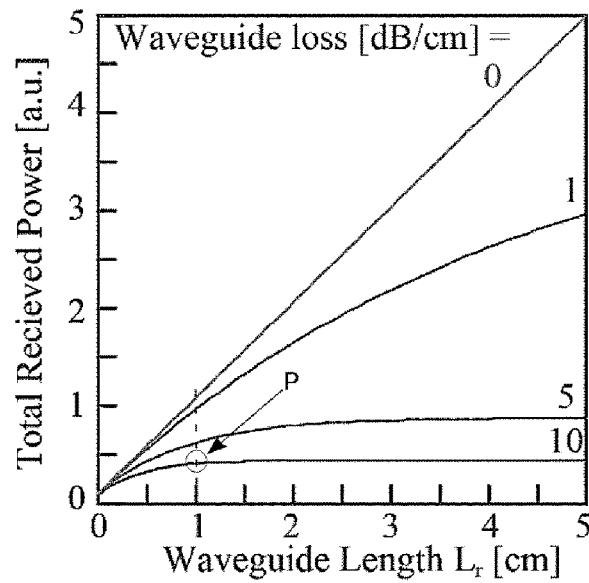
FIG. 2 is a diagram showing reception strength to length Lr of a reception wavelength.

According to a characteristic of reception strength to length Lr of a slow light waveguide for reception shown in FIG. 2, the reception strength of the slow light waveguide has an unsaturated region A monotonously changed according to the length while the propagation loss in the slow light waveguide depends on the waveguide length, and a saturated region B not changed even when the waveguide length is changed by increasing an attenuating amount of propagation light. This characteristic shows that the reception strength is not increased even when the waveguide length is made longer in the saturated region B.

The receiver according to the present invention, in the array alignment of the plural receivers, limits the length in the traveling direction of the slow light waveguide for reception within the unsaturated range A in which the reception strength to the length of the slow light waveguide is monotonously changed. By this length limitation, the propagation loss occurred in the slow light waveguide of the receiver is made an amount according to a length of the slow light waveguide for reception in the traveling direction and the length of the receiver is within effective length, so as to restrain the receiver from having excessive length. When the length of the light deflection device is limited by this length limitation, the substantial propagation loss generated in the slow light waveguide of the receiver is reduced, so as to restrain reduction of the reception strength of the receiver and increase the signal strength of the reception signals of the receiver.

(Constitution of Waveguide of Receiver Array)

Figure 5:
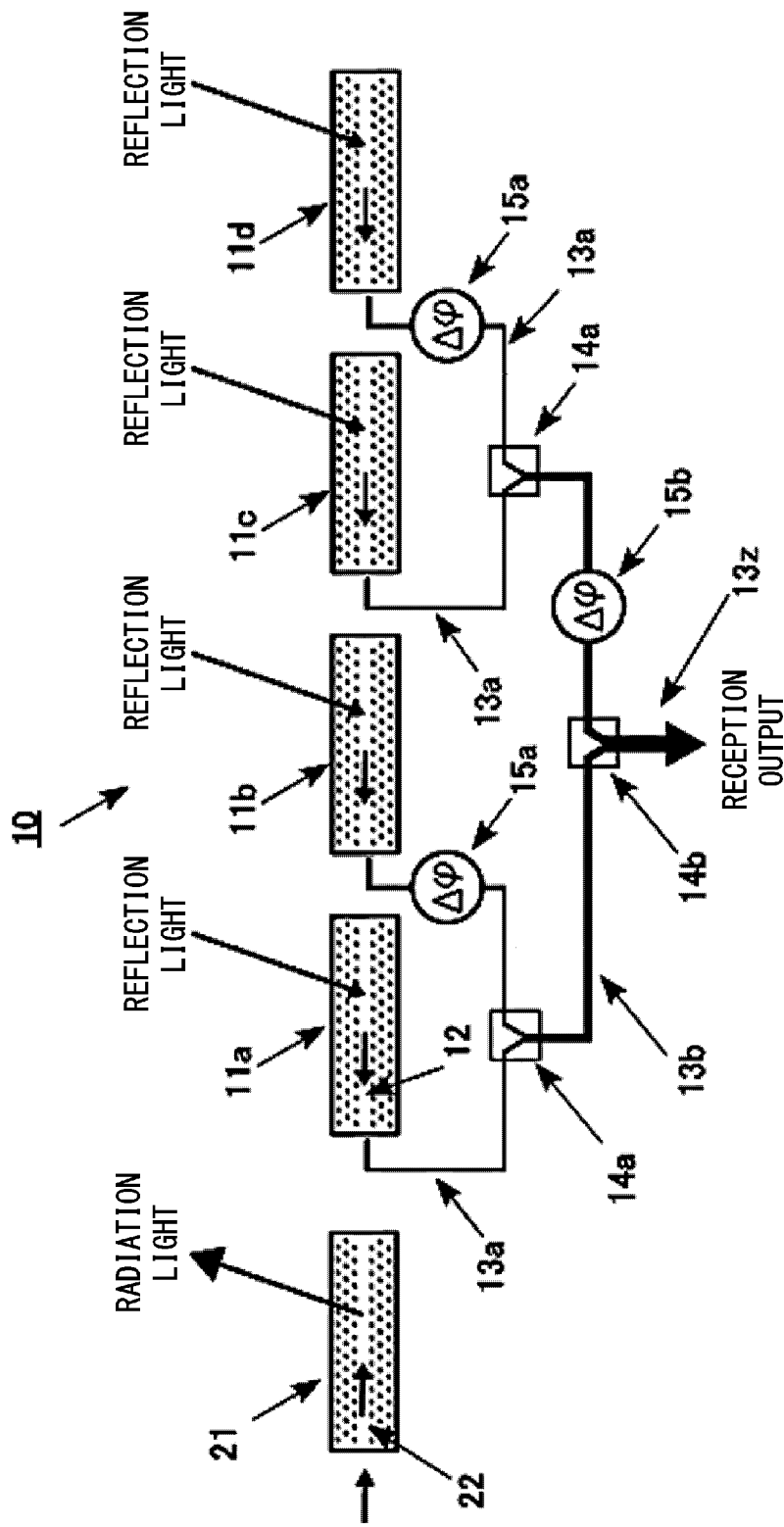
FIG. 5 is a diagram for explaining constitutions of the receivers of the receiver array and a waveguide.

FIG. 5 is a diagram for explaining constitutions of a receiver of a receiver array and a waveguide. Also, a waveguide explained here is a member for guiding output signals of each receiver of the receiver array, and includes an emission waveguide connected to each waveguide end of the receiver, a final waveguide for finally outputting output signals, and a connection waveguide constituting an optical path between the emission waveguide and the final waveguide.

FIG. 5 shows a constitution example that light picked up from each waveguide end of the receiver 11 is multiplexed to one emission waveguide. In this constitution example, light picked up from the waveguide ends of four receivers 11a-11d is multiplexed to one final waveguide 13z.

In this constitution, the receivers 11a, 11b and two emission waveguides 13a are jointed to one connection waveguide 13b by a 2×1 (2 inputs/1 output) jointer 14a, the receivers 11c, 11d and two emission waveguides 13a are jointed to one connection waveguide 13b by a first 2×1 jointer 14a, and two connection waveguides 13b are jointed to one final waveguide 13z by a second 2×1 jointer 14b, so as to multiplex final output signals.

At that time, if length from the waveguide end of each slow light waveguide 12 for reception to the final waveguide 13z is the same, optical path length from when the light is emitted from each slow light waveguide 12 for reception until it is jointed to the respective jointers 14a, 14b is equal. Also, if the phase when the light is emitted from each slow light waveguide 12 for reception is the same, the phases at which the light is incident on the jointers 14a, 14b are aligned, so that unnecessary loss by the jointers 14a, 14b is restrained.

A device using a multi-mode interference waveguide has been already developed as such a jointer. Excessive loss evaluated in a test is 0.23 dB, which is small. In the case of the constitution shown in FIG. 5, two jointers 14a, 14b are used to multiplex four slow light waveguide 12 for reception, and the excessive loss is 0.46 dB, which is also small. If it is calculated to transmission ratio from the waveguide end to the final waveguide, it is about 90%.

If the light receiver array is constituted by eight receivers, the loss of the jointer is 0.69 dB when the reception signals are multiplexed by three jointers. If the light receiver array is constituted by sixteen receivers, the loss of jointers is 0.92 dB when the reception signals are multiplexed by four jointers. In any case, the loss of the jointers is not excessive.

Meanwhile, a typical value of propagation loss of a Si thin thine waveguide itself is 2 dB/cm. If total extension of the slow light waveguide for reception is 3 cm, when the waveguide is constituted as shown in FIG. 5, the length from each waveguide end to the final waveguide is about 1.5 cm, which is a half of the total extension of the receiver and the propagation loss is 3 dB.

This propagation loss is excessive for a LiDAR device, and the loss can be made low by enlarging the waveguide width at a straight line portion. For example, normal waveguide width of a Si thin line is 400-450 nm, but if it is extended to about 4 µm, the propagation loss is reduced to about 0.5 dB/cm. The total loss with combination of the above-mentioned jointer loss 0.46-0.92 dB is restrained to 1-2 dB.

In an actual device, even when the optical path lengths are identical to each other from the waveguide end to the jointer, the phase might be displaced by local swing of width and thickness of the waveguide. Phase adjusters 15a, 15b constituted by a heater and the like are arranged on the emission waveguide on a single side of the two emission waveguide 13a incident to the jointer 14a and on the connection waveguide on a single side of the two connection waveguides 13b incident to the jointer 14b, against the phase displacement. By using the phase adjusters, unnecessary phase displacement is compensated.

(Number (Division Number) of Receivers)

Then, the number (division number) of the plural receivers constituting a light receiver array according to the present invention will be explained.

In a form for outputting reception signals per receiver, the number of receivers is optionally set. For example, when the reception signals of the emission waveguide of a low loss light waveguide 13 connected to the waveguide end of the respective receivers 11a-11d are utilized as output signals in FIG. 3, the number of receivers can be optionally defined.

Meanwhile, as shown in FIG. 5, a form for multiplexing reception signals of the respective receivers and outputting one reception signal may include a constitution for using an optional number of receivers, and a constitution for using a power-of-two number of receivers.

In the constitution for using the power-of-two number of receivers, a first jointer is provided at a position of optical path length equal from emission waveguides of adjacent receivers in an array alignment direction to multiplex the reception signals of two receivers to the connection waveguide, and a second jointer is provided at a position of optical path length equal from adjacent connection waveguides in an array alignment direction to multiplex the reception signals of two connection waveguides to the next connection waveguide. The constitutions of the connection waveguide and the second jointer are sequentially repeated, so as to multiplex the reception signals of all receivers to the final waveguide.

The number of the receivers is made power-of-two, so that the jointers for making the reception signals of the two receivers incident are used, and the optical path lengths from each receiver to the final waveguide can be made equal to each other. By making the optical path lengths equal to each other, loss due to phase displacement of the reception signals at each jointer can be reduced.

FIG. 6 shows constitution examples of receivers of receiver array and a waveguide according to the present invention. FIGS. 6A, 6B, 6C show constitution examples that the power-of-two number of receivers are used.

Figure 6A:
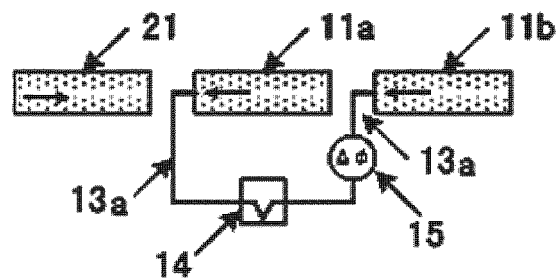
FIG. 6A is a diagram for explaining a constitution example of the receivers of the receiver array and the waveguide, and shows an example that the light receiver array is constituted by two receivers.

FIG. 6A shows the example that the light receiver array is constituted using two (=$2^1$) receivers 11$a$, 11$b$. In this constitution example, one emission waveguide 13$a$ is connected to a waveguide end of the receiver 11$a$, the other emission waveguide 13$a$ is connected to the waveguide end of the receiver 11$b$, the phase adjuster 15$a$ is provided, and the reception signals of the two emission waveguides 13$a$ are jointed to the jointer 14$a$ and multiplexed.

In the constitution example shown in FIG. 5, the light receiver array is constituted using four (=$2^2$) receivers 11$a$-11$d$.

Figure 6B:
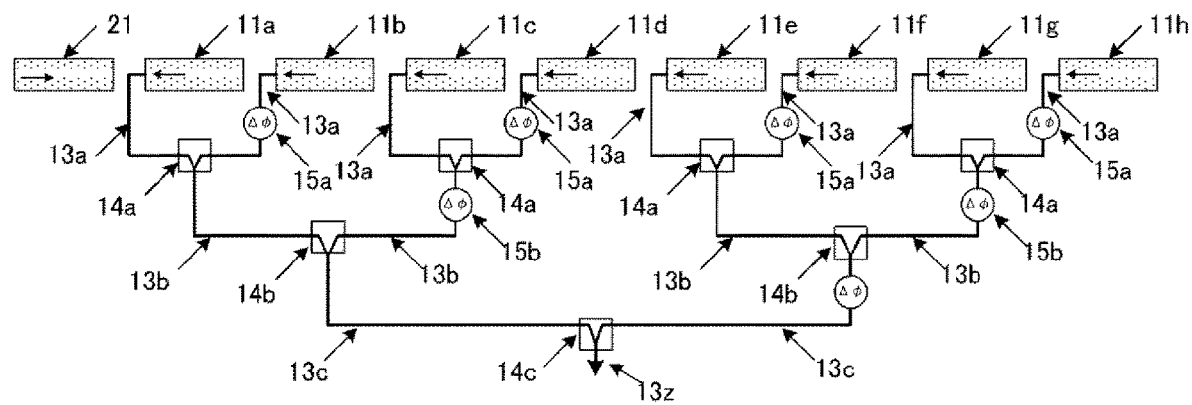
FIG. 6B shows an example that the light receiver array is constituted by eight receivers.

FIG. 6B shows the example that the light receiver array is constituted using eight (=$2^3$) receivers 11$a$-11$h$. In this constitution example, the receiver 11$a$ and the receiver 11$b$ adjacent to each other in an alignment direction are paired, the reception signal of the emission waveguide 13$a$ is jointed to the reception signal of the first jointer 14$a$, the receiver 11$c$ and the receiver 11$d$ are paired to joint the reception signals, and the connection waveguide 13$b$ is jointed to the second jointer 14$b$. Also, regarding the receivers 11$e$-11$h$, the connection waveguide 13$b$ is jointed to the second jointer 14$b$ in the similar constitution, and the two connection waveguides 13$c$ are jointed to the second jointer 14$c$, so as to output the output signals from the final waveguide 13$z$.

Figure 6C:
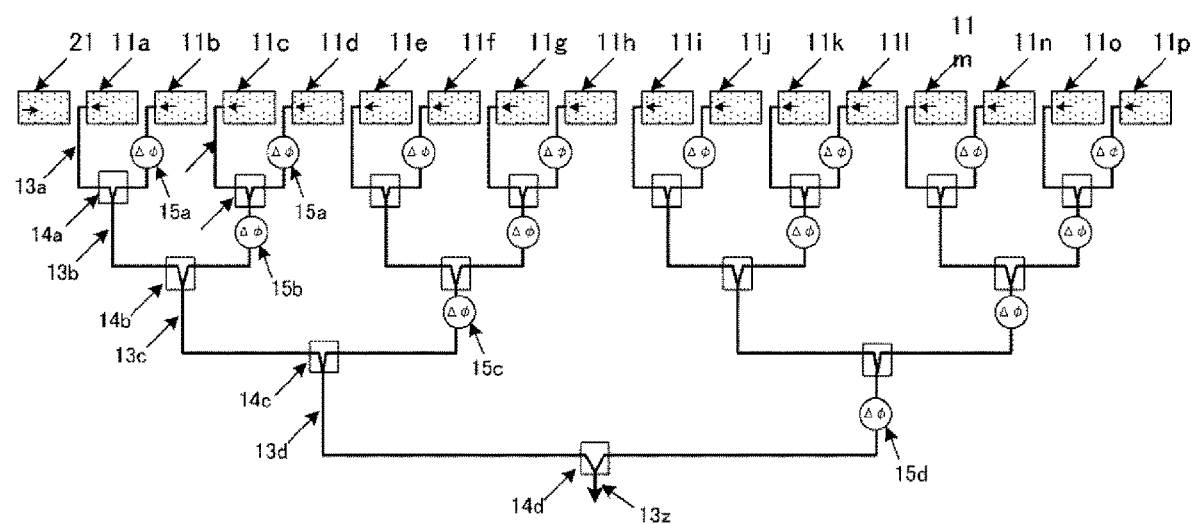
FIG. 6C shows an example that the light receiver array is constituted by sixteen receivers.

FIG. 6C shows the example that the light receiver array is constituted using sixteen (=$2^4$) receivers 11$a$-11$p$. In this constitution example, as is similar to the constitution example of FIG. 6B, two receivers adjacent to each other in the alignment direction are paired, the emission waveguide 13$a$ and the connection waveguides 13$b$, 13$c$ are jointed to the first jointer 14$a$ and the second jointers 14$b$, 14$c$, and the connection waveguide 13$d$ is jointed to the second jointer 14$d$, so as to output the output signals from the final waveguide 13$z$.

The number of the receivers 11 is made power-of-two and the jointers are arranged between the receivers adjacent to each other in the alignment direction or the emission waveguide and the connection waveguide, so that it is easy to form a path of a waveguide for making optical path lengths in a corresponding zone from each receiver to the final waveguide equal to each other, so as to restrain phase displacement at the jointer and loss due to the phase displacement.

Figure 6D:
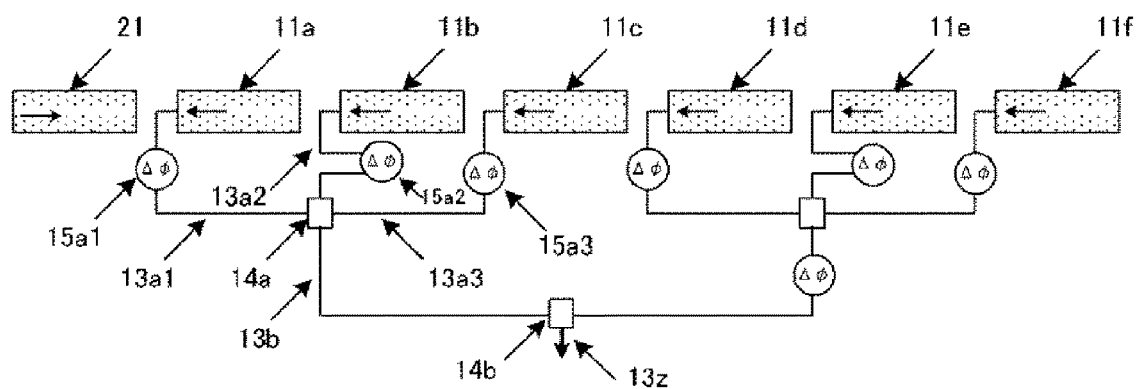
FIG. 6D shows an example that the light receiver array is constituted by receivers the number of which is not power-of-two.

FIG. 6D shows a constitution example of a waveguide when the number of receivers is not power-of-two. In the constitution example shown here, regarding a set of three receivers (11$a$-11$c$, 11$d$-11$f$) continued in the alignment direction, emission waveguides 13$a$1, 13$a$2, 13$a$3 are jointed to the first jointer 14$a$, and the two connection waveguides 13$b$ are jointed to the second jointer 14$b$, so as to output the output signals from the final waveguide 13$z$.

In this constitution, a 3×1 (3 inputs/1 output) jointer is used as the first jointer 14$a$, to respectively multiplex the reception signals of the three receivers 11$a$-11$c$ and the reception signals of the three receivers 11$d$-11$f$. Here, when the first jointer 14$a$ is arranged at a center position of the linear arrangement of the three receivers 11$a$-11$c$, the optical path length of the emission waveguide 13$a$2 becomes different from those of the emission waveguides 13$a$1, 13$a$3, so that the optical path lengths are made equal to each other by adjusting the optical path length of the emission waveguide 13$a$2.

(Alignment Pitch P)

A phase of the reception light emitted from a slow light waveguide end for reception of each receiver is different depending on an alignment pitch p of the receivers and an arrival angle $\Delta\theta t$ of arriving reflected light, and it not always equal.

FIGS. 7A-7D show conditions that arriving reflected lights arrive at each slow light waveguide for reception at a similar angle, in a light receiver array in which respective reception waveguides are aligned at the same alignment pitch p.

Figure 7A:
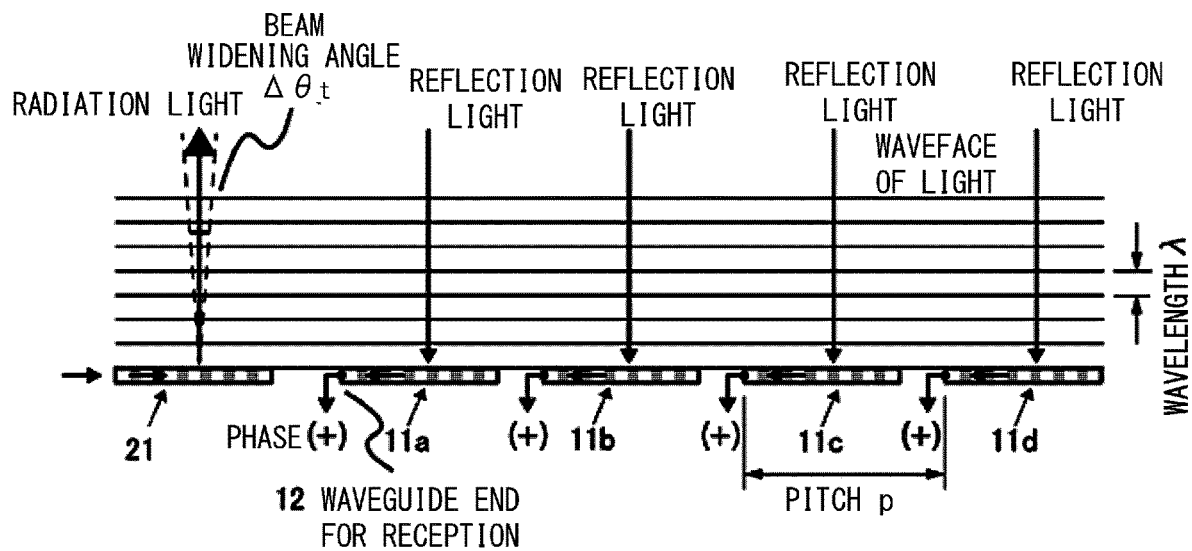
FIG. 7A is a diagram for explaining an alignment pitch of plural receivers, and shows when reflected light arrives from a plane vertical direction.

FIG. 7A shows when the reflected light arrives from a plane vertical direction. In this case, the phases of the reception lights at the waveguide ends of the receivers are equal to each other for all waveguides.

Figure 7B:
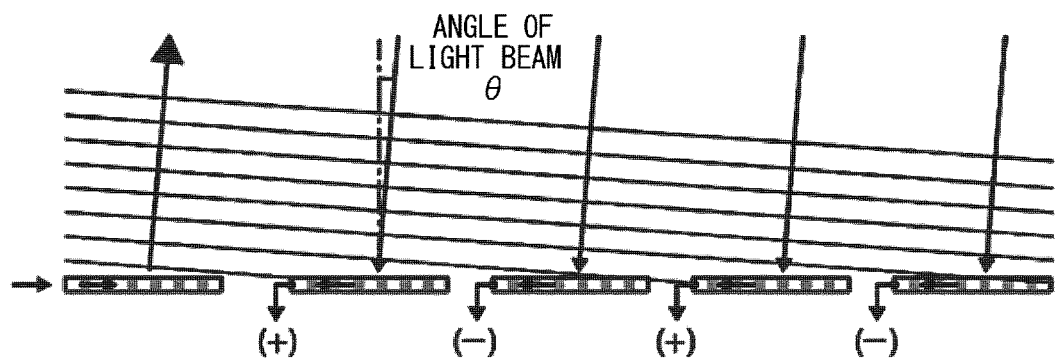
FIG. 7B shows when an incident angle of the reflected light changes, and the light arrives displaced from the plane vertical direction by an angle $\Delta\theta$.

FIG. 7B shows when the incident angle of the reflected light varies and arrives displaced from the plane vertical direction by an angle $\Delta\theta$. When the incident angle of the reflected light varies, if the phase of the light from a certain slow light waveguide for reception is (+), the phase of the light from the other slow light waveguide for reception might be (−). In this manner, the reception lights with the opposite phases are multiplexed, interference for offsetting the signal strengths occurs. In the worst case, the signal strength of the received outputs finally multiplexed becomes zero.

Figure 7C:
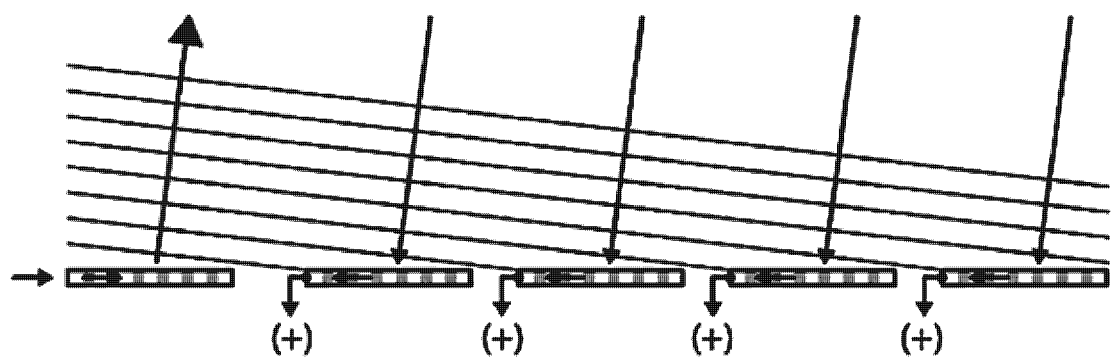
FIG. 7C is a diagram showing a state that the arrival angle of the reflected light is further increased.

FIG. 7C shows a state that the arrival angle of the reflected light becomes larger. In this state, such a condition that the phase of the reception light at the waveguide end of the receiver is displaced by one wavelength and aligned again is generated. Under such a state, interference for increasing the light outputs finally multiplexed occurs again. Depending on an angle, such a state is repeated. When an object is measured by a LiDAR device only at such an angle that the multiplexed light outputs are increased by each other, such a problem is solved that the signal strength is attenuated by offsetting the signal strengths with the opposite phases.

Figure 7D:
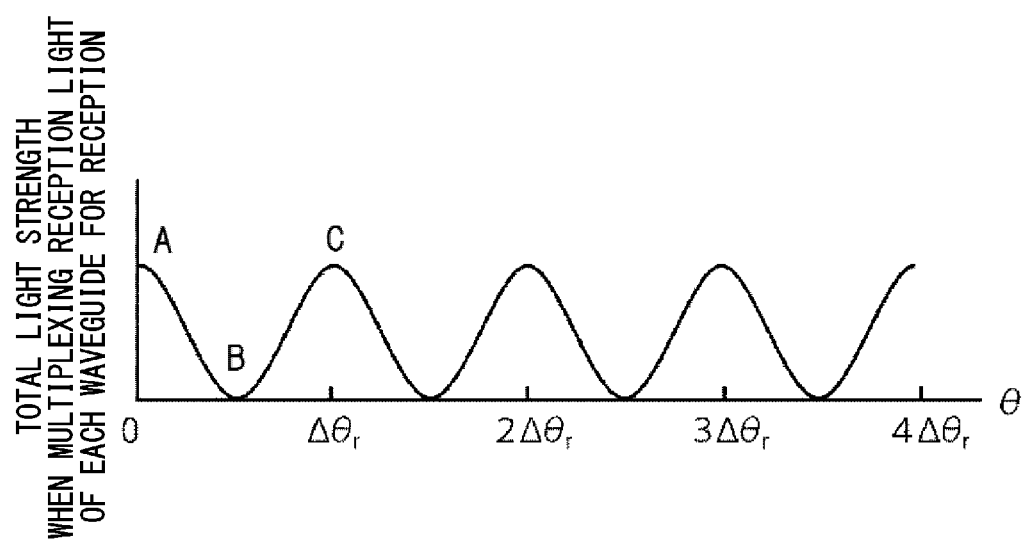
FIG. 7D is a diagram showing a relationship between strength of light signals obtained by multiplexing reception lights of a slow light waveguide for reception of each receiver and the arrival angle $\Delta\theta$ of the reflected light.

FIG. 7D shows a relationship between strength of light signals obtained by multiplexing reception light of a slow light waveguide for reception of each receiver and an arrival angle $\Delta\theta$ of reflected light. The strength of the light signals varies depending on the above-mentioned interference according to the arrival angle $\Delta\theta$, with $\Delta\theta r$ as a cycle.

Figure 8A:
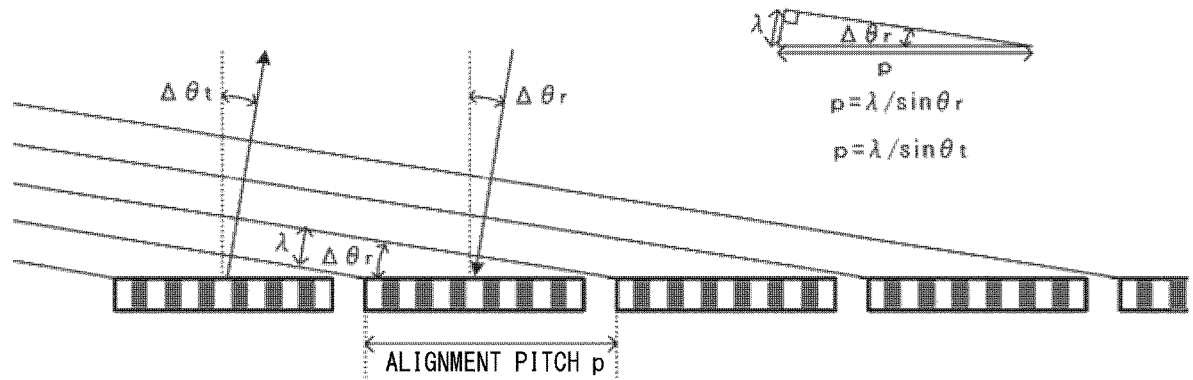
FIG. 8A is a diagram for explaining an alignment pitch of plural receivers, and shows a relationship between an angle $\Delta\theta_r$ at which interference for increase occurs, and alignment pitches p, t of the receivers.

FIG. 8A shows a relationship between an angle $\Delta\theta_r$ at which interference for increase occurs and alignment pitches p, t of the receivers. When wavelength of the reflected light is $\lambda$, the condition for increasing the light signals of the reception light is expressed by the following formula (1) and the alignment pitch p is expressed by a formula (2).

$$p \cdot \sin \Delta\theta_r = \lambda \quad (1)$$

$$p = \lambda / \sin \Delta\theta_r \quad (2)$$

Meanwhile, the beam of radiation light emitted from the transmitter depends on waveguide length and propagation loss of the transmitter, and a widening angle $\Delta\theta_t$ of the beam of the radiation light is determined based on the parameters. For example, when the propagation light is uniformly leaked to form beam using wavelength $\lambda=1.55$ µm and the length of the transmitter of 3 mm, the widening angle $\Delta\theta_t$ is about 0.03°. However, actually, the waveguide has the structural fluctuation, so that it is considered that $\Delta\theta_t$ becomes larger. In a scanning operation of the LiDAR device, light beam of the radiation light is sequentially collided to a far object, and a distance is measured using the reflected light reflected and returned by the object.

Figure 8B:
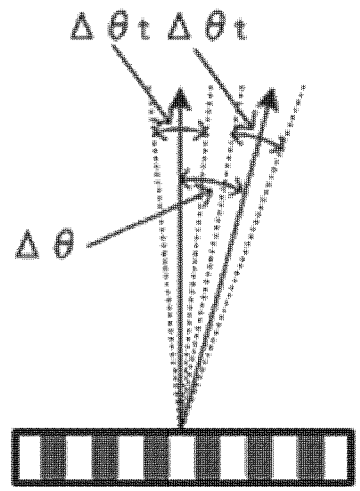
FIG. 8B shows when an angle difference $\Delta\theta$ of adjacent radiation lights is larger than a beam widening angle $\Delta\theta t$.
Figure 8C:
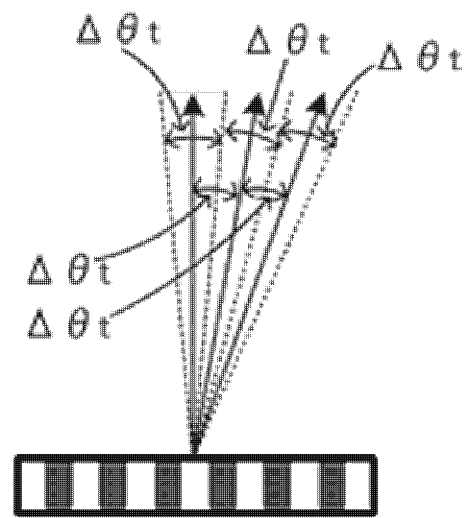
FIG. 8C shows when the angle difference $\Delta\theta$ of the adjacent radiation lights is equal to the beam widening angle $\Delta\theta t$.

FIGS. 8B and 8C are diagrams for explaining an angle difference between adjacent radiation lights in a scanning operation. FIG. 8B shows when the angle difference $\Delta\theta$ between the adjacent radiation lights is larger than the beam widening angle $\Delta\theta t$. In this case, a gap is generated between regions in which the adjacent radiation lights are emitted, and leakage is generated in the scanning region. Meanwhile, FIG. 8C shows when the angle difference $\Delta\theta$ between the adjacent radiation lights is equal to the beam widening angle $\Delta\theta t$. In this case, a gap is not generated between regions in which the adjacent radiation lights are emitted, and scanning can be performed without leakage.

Accordingly, in view of the beam widening angle $\Delta\theta t$, it is suitable to set an angle difference between light beam of a certain radiation angle and light beam of the next radiation angle to the beam widening angle $\Delta\theta t$.

Furthermore, the angle difference $\Delta\theta$ is made equal to the arrival angle $\Delta\theta r$ of reflected light that is an angle at which reception strength becomes large, so that conditions ($\Delta\theta t = \Delta\theta r$) for satisfying both of a condition of the angle difference $\Delta\theta$=the beam widening angle $\Delta\theta t$ that is a suitable condition of the scanning angle by the radiation light, and a condition of the angle difference $\Delta\theta$=the arrival angle $\Delta\theta r$ of the reflected light that is a suitable condition of the strength of the reception signal of the receiver can be obtained. At that time, the alignment pitch p is expressed by a formula (3).

$$p = \lambda / \sin \Delta\theta_t \quad (3)$$

Figure 8D:
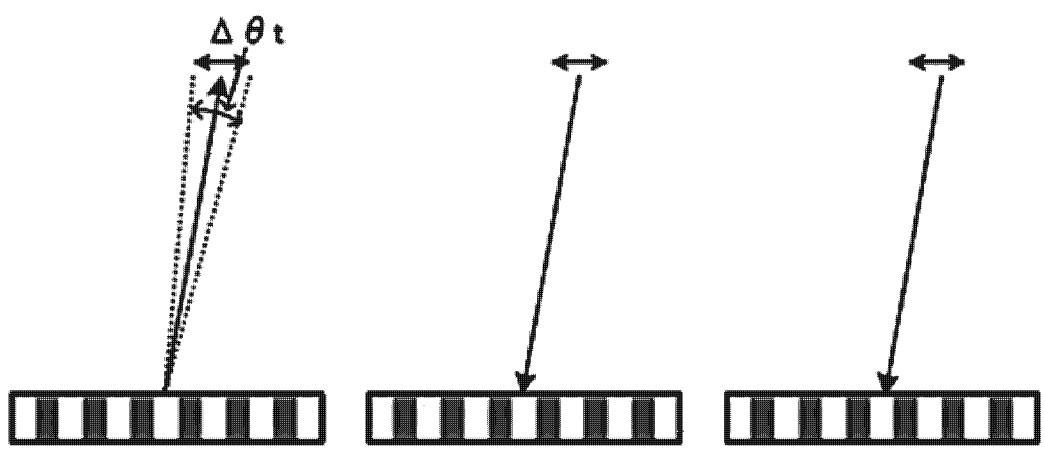
FIG. 8D is a diagram chronologically showing radiation light and reflected light when the angle different $\Delta\theta$ of the radiation light is made equal to the beam widening angle $\Delta\theta t$ of the radiation light and the arrival angle $\Delta\theta r$ of the reflected light.
Figure 8E:
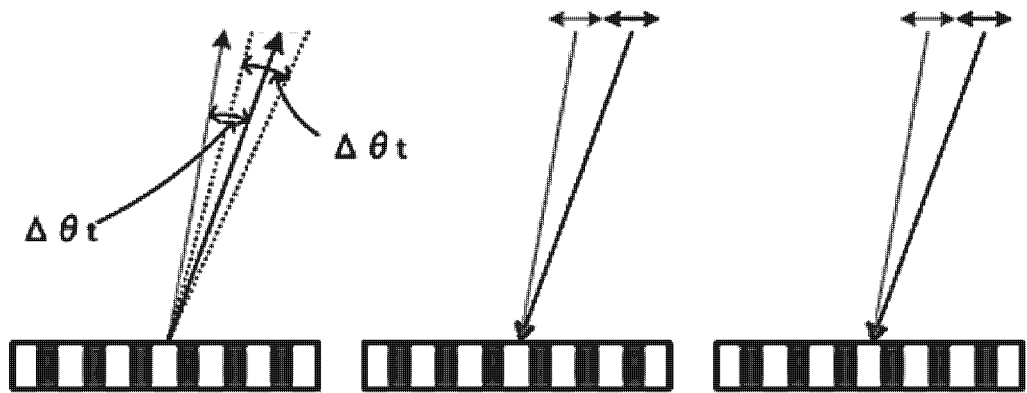
FIG. 8E is a diagram chronologically showing radiation light and reflected light when the angle different $\Delta\theta$ of the radiation light is made equal to the beam widening angle $\Delta\theta t$ of the radiation light and the arrival angle $\Delta\theta r$ of the reflected light.
Figure 8F:
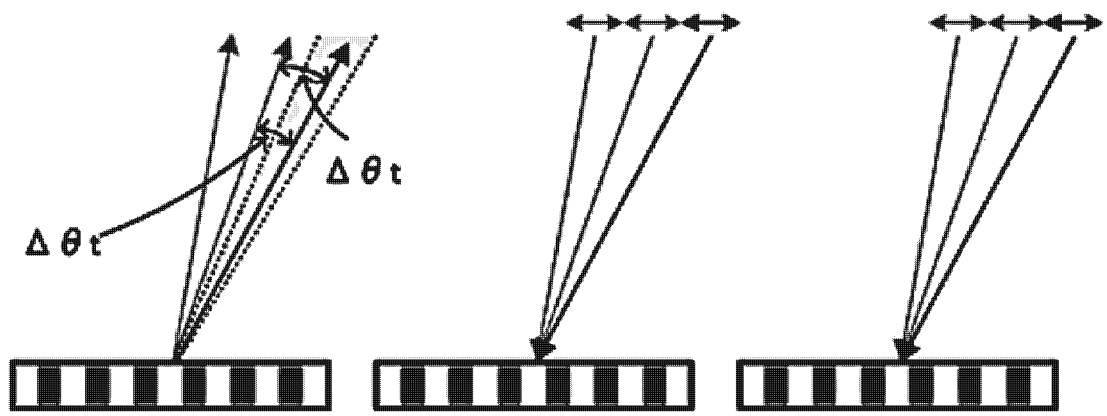
FIG. 8F is a diagram chronologically showing radiation light and reflected light when the angle different $\Delta\theta$ of the radiation light is made equal to the beam widening angle $\Delta\theta t$ of the radiation light and the arrival angle $\Delta\theta r$ of the reflected light.

FIGS. 8D-8F chronologically and schematically show radiation light and reflected light when the angle different $\Delta\theta$ of the radiation light sequentially emitted is made equal to the beam widening angle $\Delta\theta t$ of the radiation light and the arrival angle $\Delta\theta r$ of the reflected light.

In the above-mentioned formula (3), when it is supposed as $\Delta\theta t=0.03°$, the alignment pitch p=2.96 mm is satisfied, so that, for example, a receiver array can be constituted by dividing a slow light waveguide for reception of a receiver with total extension of 2.4 cm into eight.

In the constitution of eight receivers obtained by dividing the receiver into eight, the length of each receiver becomes large, and an effect for reducing loss might be limited. In this case, a resolution point is reduced, however, by setting $\Delta\theta_t$ larger to reduce the alignment pitch p, so that the number of receivers is increased to increase the signal strength.

For example, in the case of $\Delta\theta_t=0.05°$ in an actually manufactured slow light waveguide, the alignment pitch p=1.78 mm is satisfied, a receiver array can be constituted with sixteen receivers obtained by dividing a receiver with total extension of 2.8 cm into sixteen. In this constitution, as described above, 5 times larger signal strength can be obtained.

In the constitution in that the division number is made large and the number of the receivers is made large, the phase displacement is restrained using a phase adjuster. For example, when a phase change π is given to a waveguide for emitting reception signals at a (−) phase under a state of FIG. 7B by the phase adjuster, all phases can be made equal to each other. Thereby, the division number can be made twice, and the reception signals can be increased even when the propagation loss of a light polarizer is larger than 10 dB/cm.

(Brief Explanation of LiDAR Device)

Figure 9:
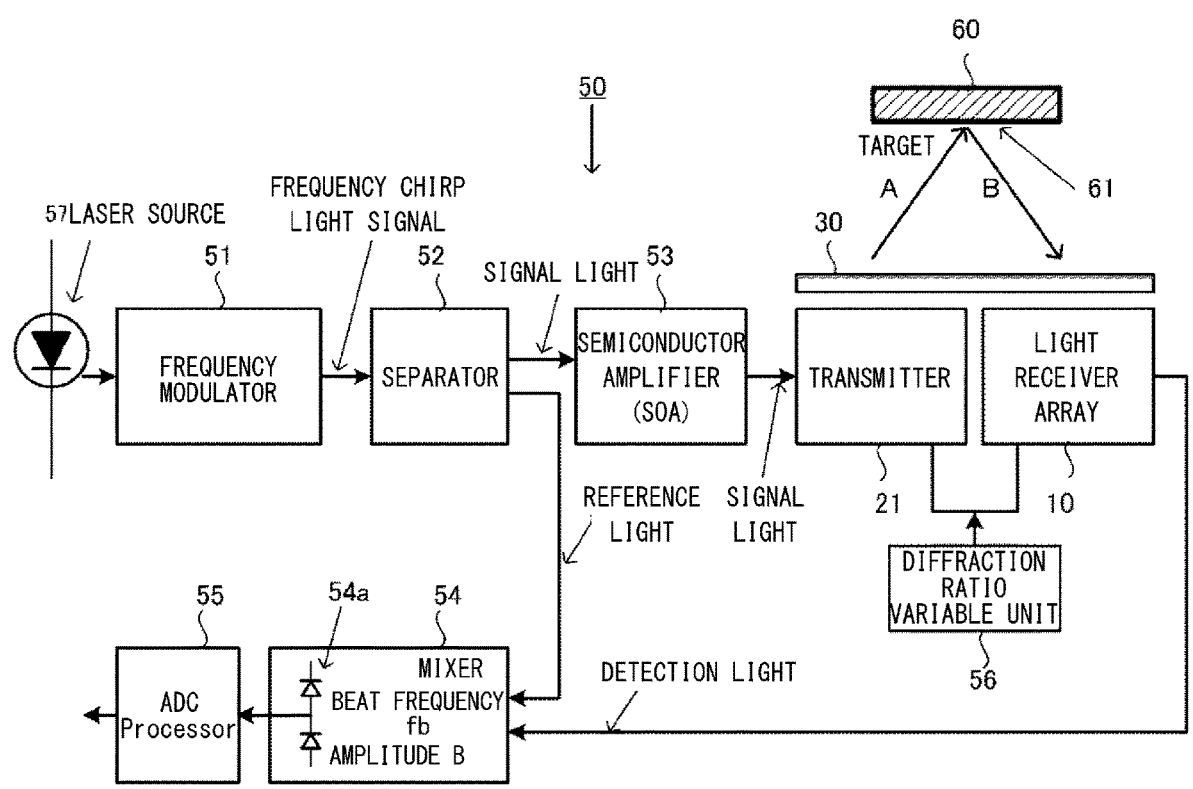
FIG. 9 is a diagram for explaining a constitution of the LiDAR device.
Figure 10A:
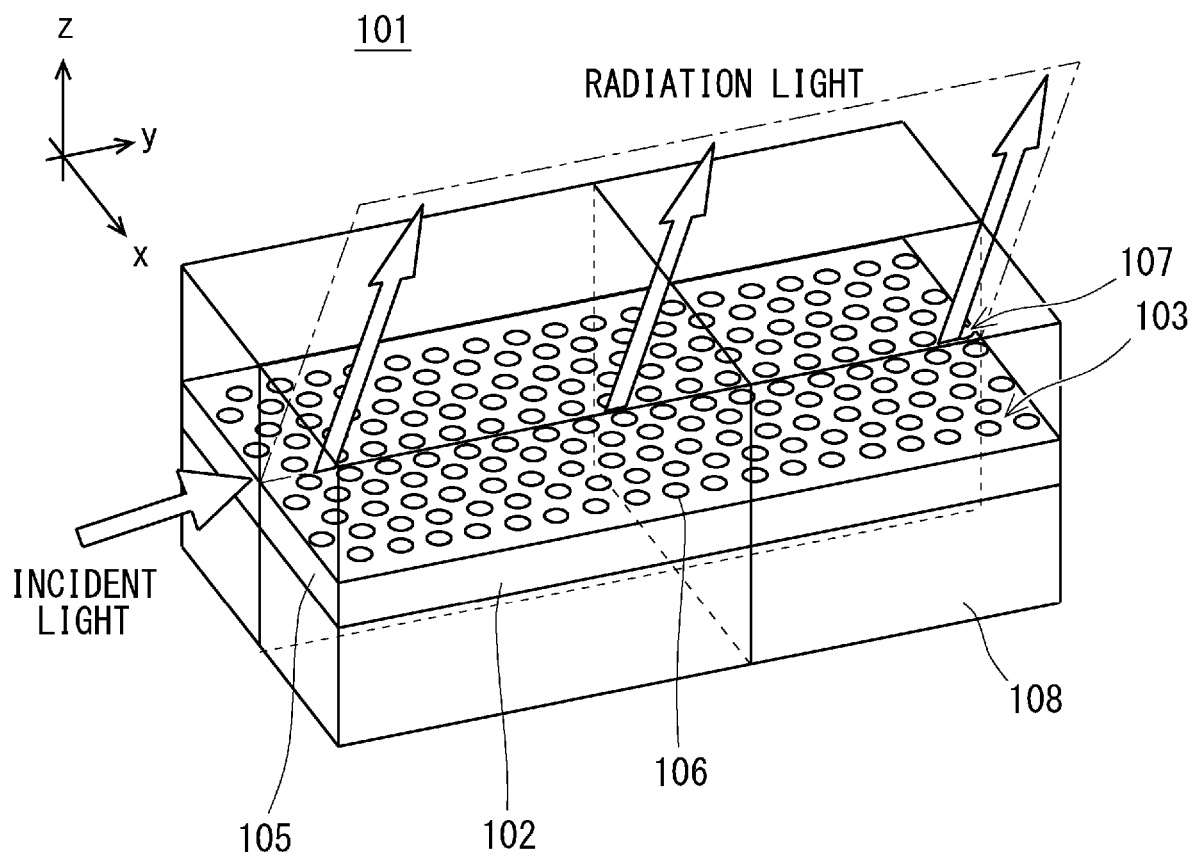
FIG. 10A is a diagram for explaining a device structure having a diffraction mechanism in a photonic crystal waveguide, and a brief concept of radiation light.
Figure 10B:
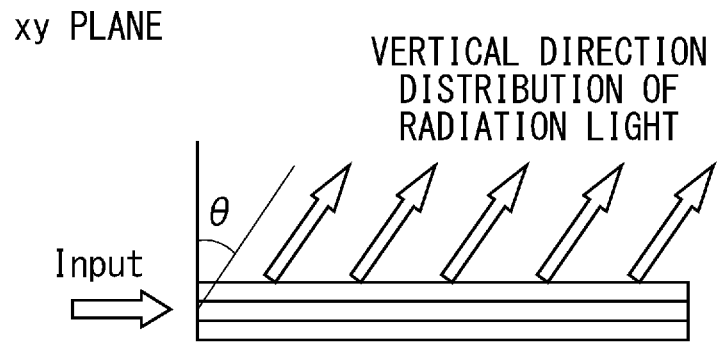
FIG. 10B shows beam strength distribution in a vertical direction.
Figure 10C:
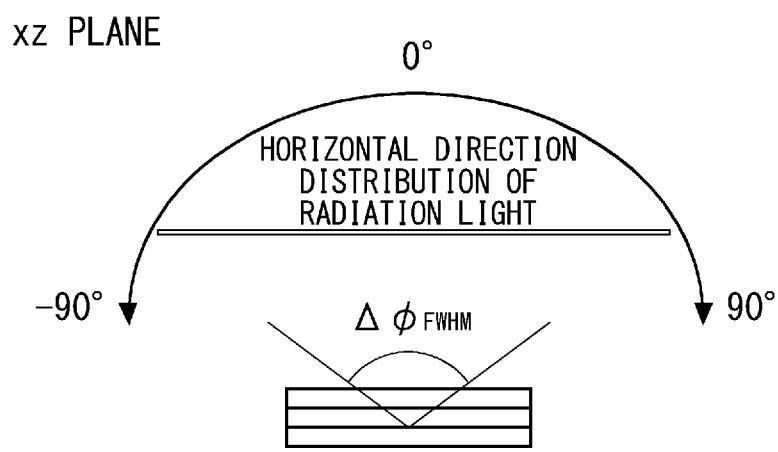
FIG. 10C shows beam strength distribution in a horizontal direction.
Figure 10D:
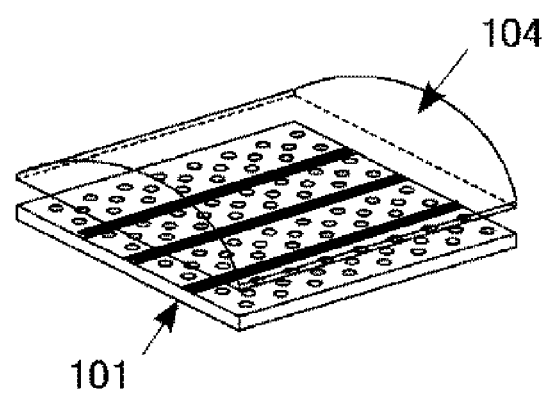
FIG. 10D is a diagram showing a constitution for restraining the radiation light from being widened in the horizontal direction.

Then, the schematic constitution of a LiDAR device according to the present invention will be explained with reference to FIG. 9.

A LiDAR device 50 includes a light receiver array 10 and a transmitter 21 according to the present invention, and emits radiation light A to an object 60 from the transmitter 21 and detects reflected light B reflected and returned by the object 60. By receiving the reflected light B while changing a radiation angle of the radiation light A, the object 60 is scanned to find a distance from the object 60. Also, relative speed of the LiDAR device 50 and the object 60 can be found.

The LiDAR device 50 includes a transmitter 21 and a light receiver array 10 linearly aligned in a vertical direction, and a collimate lens (cylindrical lens 30) arranged above them.

Signal light in incident on the transmitter 21. The signal light incident on the transmitter 21 propagates a waveguide core of a photonic crystal waveguide by slow light. The slow light is leaked to outside while propagating the waveguide core, and emits the radiation light A toward the object 60. The radiation light A is reflected by the object 60. Each receiver 11 (not shown) of the light receiver array 10 receives the reflected light B, and emits detection light from a waveguide end of the waveguide core.

A deflection angle of the transmitter 21 and each receiver of the light receiver array 10 can be changed by wavelength of the incident light or refractive index of the photonic crystal waveguide. A refractive index varying apparatus 56 for making the refractive index of the photonic crystal waveguide variable can be constituted, for example, by a device for making temperature of the photonic crystal waveguide constituting the transmitter 21 and the receiver 11 variable.

The signal light incident on the transmitter 21 uses one light obtained by separating, by a separator 52, a frequency chirp light signal having a frequency that sequentially changes. The light may be amplified by a semiconductor amplifier (SOA) 53. The other light separated by the separator 52 is guided to a mixer 54 as reference light.

A frequency modulator linearly modulates a frequency of laser light generated by a laser source 57 in a constant cycle T, so as to generate the frequency chirp light signal. The signal light and the reference light have the same frequency and phase, because they are obtained by separating the frequency chirp light signal.

The detection light obtained by the light receiver array 10 together with the reference light is guided to the mixer 54, so as to generate beat signals obtained by mixing the reference light and the detection light.

The signal light is delayed by reciprocation of the radiation light A and the reflected light B among the transmitter 21, the light receiver array 10 and the object 60. During that time, the frequency of the reference light is gradually changed by the frequency chirp. In the mixer 54, the signal light received after reciprocation of the light is mixed with the reference light, so as to detect the mixed light. The beat signals corresponding to a frequency difference between the signal light and the detection light are detected by the mixed light. The mixer 54, for example, detects the beat signals with a frequency difference corresponding to a delay time between the detection light and the reference light using a balance type photodiode 54a.

A calculation part 55 finds a distance from the object 60 based on a frequency spectrum of the beat signals obtained by the mixer 54. The calculation part 55 can be constituted, for example, by an A/D converter for A/D converting output signals of the balance type photodiode 54a, and a processor for calculation-processing resultant digital signals.

When a beat frequency of the beat signal is fb, frequency displacement width of the signal light is B, light speed is c, and one modulation cycle required for modulating one cycle of the chirp light signal is T, a distance R from a target is expressed by a following formula (4).

$$R=(c \times fb \times T)/(2 \times B) \tag{4}$$

When the relative speed to the object is obtained by the LiDAR device according to the present invention, a relative speed v is expressed by a following formula (5) using a beat frequency fu obtained using up-chirp light signal for increasing a frequency and a beat frequency fd obtained using down-chirp light signal for decreasing a frequency. Also, fo is a center frequency of the chirp light signal.

$$v=(c/4fo) \times (fu-fd) \tag{5}$$

In a LiDAR device using a slow light waveguide light polarizer as a transmitter and a receiver, even when there is real loss in a waveguide, strength of reception signals can be improved by making the waveguide length long and increasing a reception area.

As a result, a distance of an object that can be detected by the LiDAR device can be extended. Also, reflection signals can be detected in a shorter time at a higher S/N, so that a three-dimensional image of the object detected by the LiDAR device can be acquired in a shorter time and a frame rate can be improved.

Also, the present invention is not limited to the above-mentioned embodiments. Various changes can be made within the gist of the present invention, and shall not be excluded from the scope of the present invention.

INDUSTRIAL APPLICABILITY

A light deflection device according to the present invention can be mounted to an automobile, a drone, a robot and the like, and can be applied to a 3D scanner that is mounted in a personal computer and a smart phone to handily take peripheral environments, a monitoring system, a space matrix optical switch for optical conversion or a data center, and the like. Also, by applying to a visible optical material as a high refractive index member constituting the light deflection device, it is expected to be applied to a projector, a laser display, a retina display, a 2D/3D printer, a POS, a card reader and the like.

The present application claims the priority of Japanese Patent Application No. 2017-106710 filed on May 30, 2017, and disclosure thereof are entirely incorporated herein.

REFERENCE SIGNS LIST 10 light receiver array
11, 11a-11h receivers
12 slow light waveguide for reception
13 low loss light waveguide
13a emission waveguide
13a1 emission waveguide
13a2 emission waveguide
13b, 13c, 13d connection waveguide
13z final waveguide
14, 14a, 14b, 14c jointer
15, 15a, 15b phase adjuster
21 transmitter
22 slow light waveguide for transmission
30 cylindrical lens
50 LiDAR device
52 separator
54 mixer
54a balance type photodiode
55 calculation part
56 refractive index varying apparatus
57 laser source
60 object
101 light deflection device
102 photonic crystal waveguide
103 grating array
104 cylindrical lens
105 high refractive index member
106 low refractive index portion (circular hole)
107 waveguide core
108 clad
111 receiver
112 slow light waveguide for reception
121 transmitter
122 slow light waveguide for transmission

The invention claimed is:

1. A light receiver array in which plural receivers having slow light waveguides of photonic crystals are aligned in array, wherein
   (a) alignment of the respective receivers is linear alignment at an alignment pitch p along one straight line direction, and
   (b) in orientation of the respective receivers, a traveling direction of a slow light waveguide for reception of each receiver is parallel to an alignment direction of the linear alignment.

2. The light receiver array described in claim 1, wherein length in the traveling direction of the slow light waveguide for reception of each receiver is in an unsaturated range in which reception strength to length of the slow light waveguide monotonously changes.

3. The light receiver array described in claim 1, wherein a relationship p=λ/sin Δθr is satisfied between the alignment pitch p, wavelength λ of the reception light, and an arrival angle Δθr when a phase difference between reception lights received by waveguide ends of adjacent receivers is one wavelength.

4. The light receiver array described in claim 3, wherein the arrival angle Δθr is equal to a widening angle Δθt of radiation light.

5. The light receiver array described in any one of claim 1, wherein
   each receiver includes photo diodes as a pair, the photo diodes being optically coupled to the waveguide end of each slow light waveguide for reception via a low loss light waveguide, and
   light waveguide lengths of the receiver and the low loss light waveguide in each pair of photodiodes are equal to each other.

6. The light receiver array described in claim 1, comprising:
- an emission waveguide connected to the waveguide end of the slow light waveguide for reception of each receiver;
- a first jointer for jointing the emission waveguide to a connection waveguide;
- a second jointer for jointing the connection waveguide to other connection waveguide; and
- a final waveguide for guiding output signals obtained by multiplexing reception outputs of the receivers to an output end, wherein
- the emission waveguide, the connection waveguide and the final waveguide are low loss light waveguides, and
- optical path lengths from the respective slow light waveguides for reception to the final waveguide are equal to each other.

7. The light receiver array described in claim 6, wherein the emission waveguide and the waveguide selectively comprise phase adjusters.

8. The light receiver array described in claim 6, wherein the number of the receivers is power-of-two, the first jointer is provided at an equal position of the optical path length between emission waveguides of the adjacent receivers in an array alignment direction, and the second jointer is provided at an equal position of the optical path length between the adjacent connection waveguides in the array alignment direction.

9. A LiDAR device comprising
a light receiver array according to claim 1, and
one transmitter for emitting radiation light having a slow light waveguide of a photonic crystal, wherein
in an alignment direction of the light receiver array, a traveling direction of a waveguide of a receiver is the same as a traveling direction of a waveguide of the transmitter.

10. The LiDAR device described in claim 9, wherein
an angle between adjacent radiation lights emitted from the transmitter and a widening angle of the radiation light are the same angle $\Delta\theta t$, and
the angle $\Delta\theta t$ is equal to an arrival angle $\Delta\theta r$ when a phase difference between reception lights received at waveguide ends of adjacent receivers is one wavelength.

* * * * *